US012366764B2

(12) United States Patent
Huber

(10) Patent No.: US 12,366,764 B2
(45) Date of Patent: Jul. 22, 2025

(54) POLARIZED STEREOSCOPIC DISPLAY SYSTEM

(71) Applicant: LIMINAL SPACE, INC., Los Angeles, CA (US)

(72) Inventor: Nathaniel Huber, Hollywood, CA (US)

(73) Assignee: Liminal Space, Inc., Los Angeles, CA (US)

(*) Notice: Subject to any disclaimer, the term of this patent is extended or adjusted under 35 U.S.C. 154(b) by 343 days.

(21) Appl. No.: 17/408,346

(22) Filed: Aug. 20, 2021

(65) Prior Publication Data
US 2023/0056219 A1 Feb. 23, 2023

(51) Int. Cl.
*G02B 30/25* (2020.01)

(52) U.S. Cl.
CPC .................................. *G02B 30/25* (2020.01)

(58) Field of Classification Search
CPC ........ G02B 30/25; G02B 30/22; G02B 30/00; G02B 30/33; H04N 13/324; H04N 13/257; H04N 2013/0074; H04N 2013/0077; H04N 2013/0092; H04N 2013/0096
USPC .............. 359/462–466; 348/42–60; 353/7–9; 349/8–9, 15
See application file for complete search history.

(56) References Cited

U.S. PATENT DOCUMENTS

| | | | |
|---|---|---|---|
| 7,349,156 B2* | 3/2008 | Daiku | G02B 30/25 348/57 |
| 8,542,270 B2 | 9/2013 | Nelson | |
| 9,631,799 B2 | 4/2017 | Chien et al. | |
| 2008/0225143 A1 | 9/2008 | Joffer et al. | |
| 2010/0231700 A1* | 9/2010 | Jalbout | H04N 13/337 348/58 |
| 2011/0242150 A1 | 10/2011 | Song et al. | |
| 2016/0021367 A1 | 1/2016 | Yoon et al. | |
| 2018/0059429 A1* | 3/2018 | Huber | H04N 13/332 |
| 2020/0014902 A1* | 1/2020 | Chen | G02B 30/25 |
| 2020/0124869 A1* | 4/2020 | Huber | H01L 25/0753 |
| 2020/0211508 A1 | 7/2020 | Clarke et al. | |
| 2020/0218112 A1 | 7/2020 | Chae et al. | |

FOREIGN PATENT DOCUMENTS

WO   WO-2004/0755626 A2   9/2004

OTHER PUBLICATIONS

International Search Report and Written Opinion dated Dec. 9, 2022 for PCT/US2022/040713, 12 pages.

* cited by examiner

*Primary Examiner* — Jyotsna V Dabbi
(74) *Attorney, Agent, or Firm* — Fish IP Law, LLP

(57) ABSTRACT

A stereoscopic display system has a non-planar display, in which some of the light emitting packages or polarizers are rotated relative to other packages. The out-of-normal orientation provides improved 3D imaging to an observer viewing the display through stereoscopic glasses.

19 Claims, 4 Drawing Sheets

POLARIZED STEREOSCOPIC DISPLAY SYSTEM

FIELD OF THE INVENTION

The field of the invention is three-dimensional (3D) stereoscopic display systems.

BACKGROUND

The background description includes information that may be useful in understanding the present invention. It is not an admission that any of the information provided herein is prior art or relevant to the presently claimed invention, or that any publication specifically or implicitly referenced is prior art.

Stereoscopic display systems attempt to recreate a real world visual experience where a viewer sees a different view or image in each eye. In a real world viewing experience, a viewer with two eyes sees two slightly different images, as each eye is spaced apart in a slightly different viewing position. A goal of stereoscopic video display systems is to present a separate and different view to each eye of the viewer to create a 3D experience.

Earlier attempts to recreate a stereoscopic 3D experience employed an apparatus similar to corrective eyewear comprising of one lens of one color, and a second lens of a second color. In some cases, a monitor or projector projected two different views onto one screen, with each view being color-coded so as to be complementary to one lens or the other. However, the use of color to segregate viewing channels would often lead to headaches for a viewer. It has been further proposed that using separate groups of sub-pixels for each viewer could provide a better result than a traditional display. For example, US Patent Publication US 2020/0211508 titled "MULTI-USER PERSONAL DISPLAY SYSTEM AND APPLICATIONS THEREOF" to Clarke teaches interposing lenticular sheets or parallax barriers over the pixelated array of a display to provide a visible picture to the viewer.

However, these display systems are not suitable for a 3D viewing experience as any mismatched polarity between the polarizers on the viewers 3D glasses and the display is likely to result in a diminished picture quality. Thus, there is still a need for effectively utilizing differing polarizing polarizer alignments and LED package alignments in a 3D display application. As used herein, and unless the context dictates otherwise, the term "package alignment" means the relative orientation of the polarizing LED package with respect to the substrate upon which the package is placed. Further, as used herein, and unless the context dictates otherwise, the term "polarizer alignment" means the relative orientation of the polarizer material with respect to the LED polarizing package.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

SUMMARY OF THE INVENTION

This application describes a stereoscopic display system having a first left polarizing Light Emitting Diode (LED) package, a first right polarizing LED package, a second left polarizing LED package, a second right polarizing LED package, wherein each of the LED packages are individually addressable, and include a polarizing element, wherein the polarizing elements of the first left polarizing Light Emitting Diode (LED) package and the second left polarizing Light Emitting Diode (LED) package are configured for a first polarizer alignment, and wherein the polarizing elements of the first right polarizing Light Emitting Diode package and the second right polarizing Light Emitting Diode package are configured for a second polarizer alignment that is different than the first polarizer alignment.

In a preferred embodiment, the first left polarizing Light Emitting Diode (LED) package and the first right polarizing Light Emitting Diode (LED) package are configured for a first package alignment, and the second left polarizing Light Emitting Diode package and the second right polarizing Light Emitting Diode package are configured for a second package alignment that is different than the first package alignment.

The differentiation between each polarizer alignment and package alignment advantageously allows for a clear picture view of an image displayed on a display panel from multiple angles. In some embodiments, the LED polarizing packages can be substantially equilateral or circular in shape.

It is to be understood that any type of polarizing LED package may be employed in the current design. While the polarizing LED package of the present description may use RGB (red, green, and blue) semiconductors, it is to be understood the invention is not so limited. Any type of semiconductors or similar devices may be employed to produce an image, including but not limited to RGBY, RGBW (white), RGB plus infrared, OLED, digital RGB, and quantum dot LEDs.

This application also describes a stereoscopic display system having a curved surface panel and a plurality of left and right polarizing LED packages coupled to the curved surface of the panel. Each of the left and right polarizing LED packages are individually addressable, and the left LED packages have a different polarizer alignment than the right LED packages. Each of the left and right polarizing LED packages also has a package alignment. In some embodiments, a first pair of LED packages having one left and one right LED package share a first package alignment and a second pair of LED packages having one left and one right LED package share a second package alignment that is different than the first package alignment. In a preferred embodiment, the display system comprises a compound curve. In a related embodiment, each of the left and right polarizing LED packages have the same polarizer alignments, and each of the left polarizing LED packages have a different package alignment than the right LED packages.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1A:
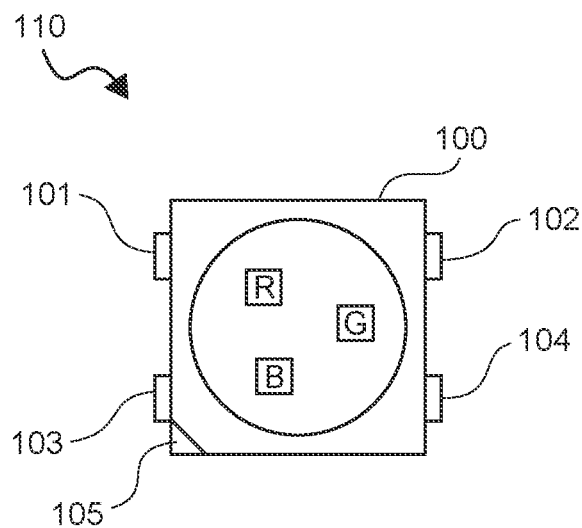
FIG. 1A is a schematic of a single Light Emitting Diode (LED) package, with one or more anode and cathode termination points.

Throughout the following discussion, numerous references will be made regarding servers, services, interfaces, engines, modules, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable media storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, engine, or a module is described as configured to perform a set of functions, the meaning of "configured to" or "programmed to" is defined as one or more processors being programmed by a set of software instructions to perform the set of functions.

The following discussion provides example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the inventive subject matter are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the inventive subject matter are approximations, the numerical values set forth in the specific examples are reported as precisely as practicable. The numerical values presented in some embodiments of the inventive subject matter may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints and open-ended ranges should be interpreted to include only commercially practical values. The recitation of ranges of values herein is merely intended to serve as a shorthand method of referring individually to each separate value falling within the range. Unless otherwise indicated herein, each individual value within a range is incorporated into the specification as if it were individually recited herein. Similarly, all lists of values should be considered as inclusive of intermediate values unless the context indicates the contrary.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the inventive subject matter and does not pose a limitation on the scope of the inventive subject matter otherwise claimed. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

FIG. 1A illustrates a polarizing LED package 110 having a housing 100, registration slot 105, anode 101, cathode 102, data information input point 103, and ground termination point 104. Polarizing LED package 110 also includes light emitting elements (LEE), denoted as R (Red), G (Green), and B (Blue) for the color each LEE is configured to emit. Anode 101, cathode 102, data information input point 103, and ground termination point 104 are configured to be mounting points for electrically coupling the polarizing LED package to a substrate.

Figure 1B:
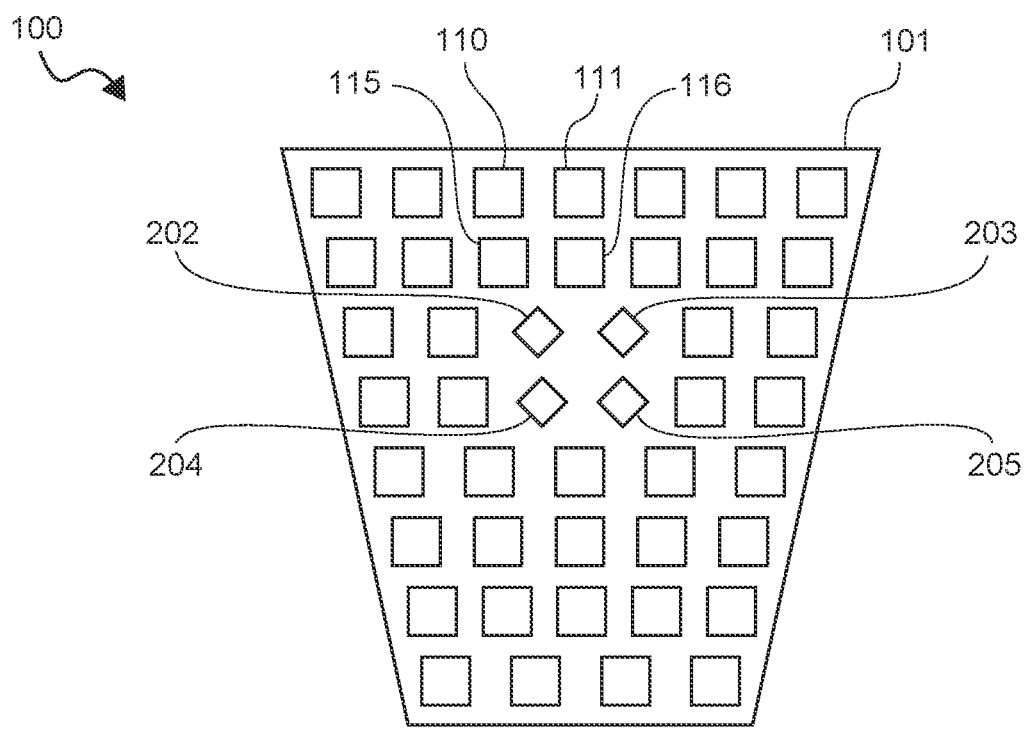
FIG. 1B is a schematic of a display tile with multiple Light Emitting Diode (LED) packages.

FIG. 1B illustrates a display panel 100 having a substrate 101 upon which polarizing a plurality of LED packages are disposed, including LED packages 110, 111, 115, and 116. In a preferred embodiment, multiple polarizing LED packages are assembled on panel 101 to create a 3D image via display panel 100. The display panel 100 may be configured in any one of a number of forms known in the industry such as part of an LED display, LED video wall, or an LED screen. In a preferred embodiment, substrate 101 is a substantially planar surface. In other embodiments, substrate 101 has a curved surface. In certain embodiments, a two-dimensional image may also be displayed by display panel 100.

In some exemplary embodiments, a polarizer material is applied to a top surface of each polarizing LED package. The polarizer material or lens may be affixed in place using an adhesive or resin, preferably as transparent an adhesive or resin as possible, or alternately provided at an exterior edge so as to minimally obscure the RGB semiconductors beneath.

With respect to use of LEDs generally in stereoscopic image projection, the applicant references the design and disclosure presented in U.S. Pat. No. 8,542,270 to Nelson, and US Pat. Pub. 2018/0059429 to Huber, the entirety of which is incorporated herein by reference.

A polarizer material can be flexible or inflexible. In some embodiments, an inflexible polarizer material could be made of acrylic or glass. Advantageously, an inflexible polarizer material would be more durable, and provide functionality for a longer period of time. For example, an inflexible polarizer material could be utilized in the manufacture of a permanent outdoor display where the display would be exposed to a variety of weather conditions. In other embodiments, a flexible polarizer material could be made of film, or other light segregating material. Advantageously, a flexible polarizer material could be applied to uneven or irregular surfaces.

The polarizer materials of polarizing LED packages 110, 111, 115, and 116 are maintained in place to form the fully assembled display panel 100. The combination of the precise orientation of the right polarizing LED packages and left polarizing LED packages assembled in an alternating pattern in a series results in a 3D stereoscopic viewing experience when used with matched 3D glasses and images in a corresponding stereoscopic video format are transmitted. The corresponding 3D video format matches one or more left eye video pixel(s) with left polarizing LED packages and one or more right eye video pixel(s) with right polarizing LED packages, with all LEDs mounted on the substrate 101.

Figure 2A:
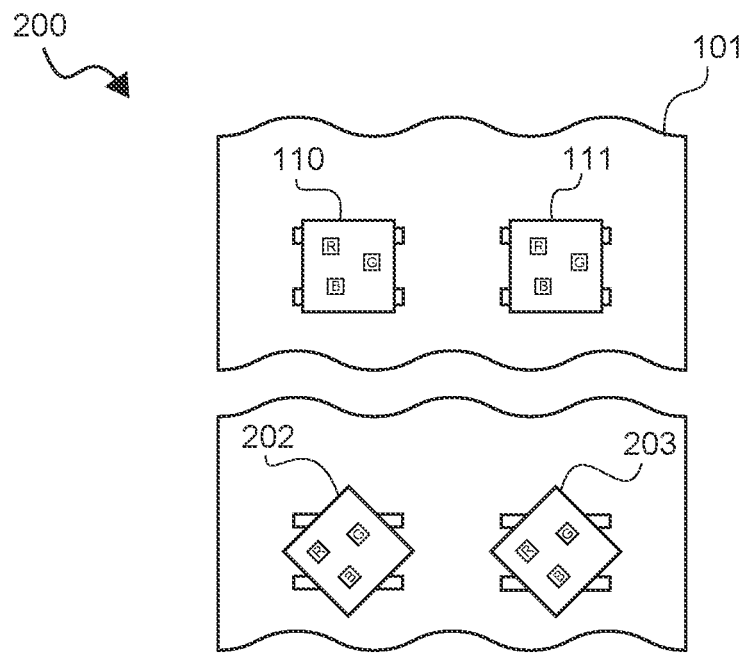
FIG. 2A is a schematic of four LED packages, with a first pair of LED packages having a first package alignment and a second pair of LED packages having a second package alignment.
Figure 2B:
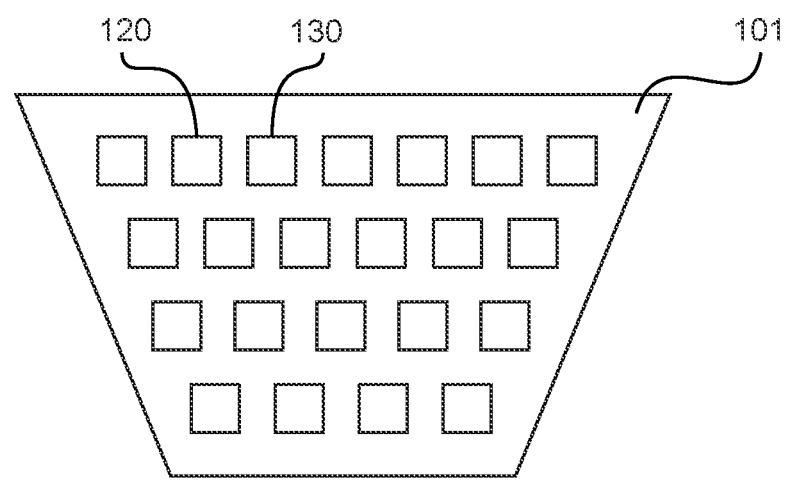
FIG. 2B illustrates an alternative LED package arrangement, where all polarizing LED packages on the substrate have the same package alignment.

FIG. 2A is a close-up view of polarizing LED packages 110, 111, 202, and 203 as disposed upon substrate 101. In this example, polarizing LED packages 110 and 111 have a first package alignment, where the mounting points for package 110 and 111 are configured to be arranged parallel to the sides of each package. Polarizing LED packages 202 and 203 have second package alignment, where the mounting points for package 202 and 203 are configured to be located in similar positions as the mounting points of package 110 and 111 relative to substrate 101, despite that packages 202 and 203 are oriented at a 45 degree rotation relative to the orientation of packages 110 and 111. In a preferred embodiment, the package alignment of polarizing LED packages 110 and 111 is different than the package alignment of polarizing LED packages 202 and 203. In a related embodiment, polarizing LED packages 110, 111, 202, and 203 have the same package alignment. FIG. 2B illustrates an example of such an embodiment, where polarizing LED packages 120 and 130 have the same package alignment.

Figure 2C:
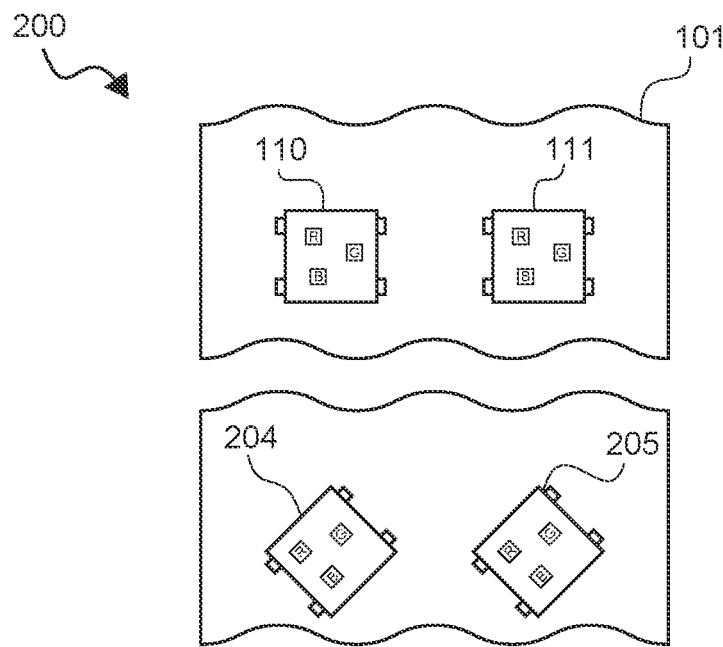
FIG. 2C is an alternative schematic of four LED packages, with a first pair of LED packages having a first package alignment and a second pair of LED packages having a second package alignment.
Figure 2D:
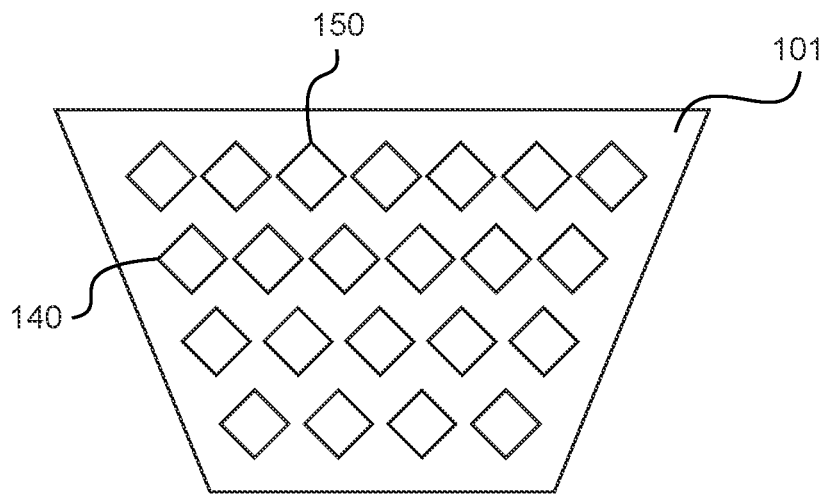
FIG. 2D illustrates an alternative LED package arrangement, where all polarizing LED packages on the substrate have the same package alignment, and are oriented at a 45 degree counter-clockwise rotation relative to the orientation of substrate.

FIG. 2C is a close-up view of polarizing LED packages 110, 111, 204, and 205 as disposed upon substrate 101. In this example, polarizing LED packages 110 and 111 have a first package alignment, where the mounting points for package 110 and 111 are configured to be arranged parallel to the sides of each package. Polarizing LED packages 204 and 205 have second package alignment, where the mounting points for package 204 and 205 are configured to be diagonal to the mounting points of package 110 and 111. Packages 204 and 205 are further configured to be oriented at a 45 degree counter-clockwise rotation relative to the orientation of packages 110 and 111. In a preferred embodiment, the package alignment of polarizing LED packages 110 and 111 is different than the package alignment of polarizing LED packages 204 and 205. FIG. 2D illustrates an example of an alternative embodiment, where polarizing LED packages 140 and 150 have the same package alignment, and are oriented at a 45 degree counter-clockwise rotation relative to the orientation of substrate 101.

Figure 3:
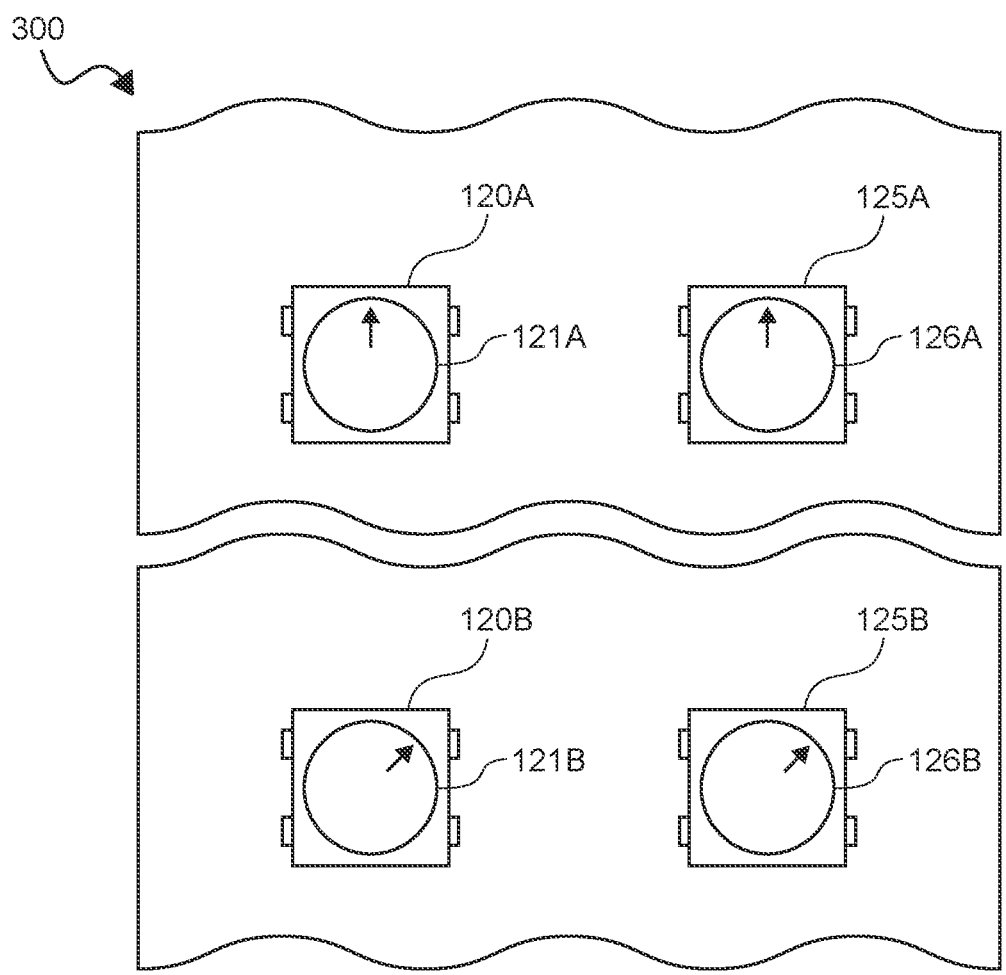
FIG. 3 is a schematic of four LED packages, where two LED packages have a first polarizer alignment, and two LED packages have a second, different polarizer alignment, where the display structure comprises multiple panels.

FIG. 3 is a close-up view of polarizing LED packages 120 and 125 as disposed upon substrate 101, with differing polarizer alignment configurations. In this example, polarizing LED package 120A has a polarizer 121A, and package 125A has a polarizer 126A, where the polarizer alignment of each polarizer is denoted by an arrow at 0 degrees. In a preferred embodiment, the mounting points for packages 120A and 125A are configured to be arranged parallel to the sides of each package. Polarizing LED package 120B has a polarizer 121B, and package 125B has a polarizer 126B, where the polarizer alignment of each polarizer is denoted by an arrow at 45 degrees. In certain embodiments, the mounting points for package 120B are configured to be parallel to the mounting points of package 125B.

The polarizing LED packages 110, 111, 115, and 116 may be arranged in a "checkerboard pattern" in which the rows alternate with a first left polarizing Light Emitting Diode (LED) package and a first right polarizing Light Emitting Diode (LED) package configured for a first package alignment, and a second left polarizing Light Emitting Diode package and the second right polarizing Light Emitting Diode package configured for a second package alignment. In another embodiment, polarizing LED packages 110, 111, 115, and 116 may be arranged in a "linear pattern" in which each row has either all left polarizing Light Emitting Diode (LED) packages or all right polarizing Light Emitting Diode (LED) packages. As used herein, and unless the context dictates otherwise, the term "linear pattern" is intended to mean alternating horizontal and/or vertical rows.

The right and left polarizing Light Emitting Diode (LED) packages ("PLEDP") can also be referred to as right PLEDP and left PLEDP. When assembling the display with a Pick and Place (PNP) machine, the pattern of the semiconductor packages may be in a checkerboard pattern comprised of alternating diagonal rows of right PLEDP and left PLEDP.

In this arrangement, the PLEDPs begin with (1) a left PLEDP, followed by (2) a right PLEDP, (3) left PLEDP, (4) right PLEDP, (5) left PLEDP, (6) right PLEDP, and so on. The next row of PLEDPs alternates, beginning with (1) a right PLEDP, followed by (2) a left PLEDP, (3) right PLEDP, and so on. The display panel 101 can also have a different pattern of alternating horizontal rows comprised of right PLEDPs and rows of left PLEDPs.

A PNP machine is the most common device used for assembling PLEDPs on a display panel. The PNP machine receives PLEDPs via carrier tape and reel. The PNP machine receives one or more reels of right PLEDPs and one or more reels of left PLEDPs. The PNP machine alternates sourcing the LEDs from right PLEDPs reel to left PLEDPs reel when placing or assembling the LEDs to achieve the alternating "checkerboard pattern" of right, left, right, left, as discussed above. Alternately, the PNP machine may receive PLEDPs from a single reel or multiple reels holding left PLEDPs and right PLEDPs alternating in sequence-right, left, right, etc. In this case the PNP machine is programmed to place the alternating PLEDPs from a single tape and reel to the specified PLEDPs pattern location to match the alternating diagonal row pattern (checkerboard pattern) or desired horizontal row pattern.

The design may include more than one PLEDP situated in a consistent rotational orientation in a carrier tape spooled on a single or multiple reels for use in a PNP machine. The specific rotation of the PLEDPs is employed in placing of the PLEDPs on the substrate in an alternating horizontal pattern or diagonal pattern.

Each carrier tape holds alternating left and right LEDs for use in a PNP machine that employs one or more reels to assemble LED tiles or modules. The orientation of the LEDs is correct within the carrier tapes shown and as a result a PNP machine does not need to evaluate orientation. If any carrier tape can be used, such a machine would need to be furnished with orientation evaluation functionality. In other words, the orientation for the LED is either known to the machine or, if not known, can be determined using orientation functionality (e.g., machine viewing and determination, human viewing, etc.) In a related embodiment, the PNP machine accounts for the rotation and alignment of a PLEDP along a curvature of the display system.

Some carrier tapes hold alternating left and right encapsulated polarized semiconductor packages. Using this arrangement, two separate reels are not necessary to feed a PNP machine. A single reel can be used to feed the PNP machine, with the carrier tape arrangement or PNP machine including functionality to determine the orientation of the encapsulated polarized semiconductor package, i.e. left or right.

To maintain consistent rotational orientation of the encapsulated polarized semiconductor packages, the PLEDPs are typically supplied to a PNP machine via carrier tape and reel. The carrier tape holds the PLEDPs proper rotation based on the PLEDPs rotation relative to guide holes of the carrier tape. A left PLEDP is placed where a left PLEDP is to be placed, and the same is true for a right PLEDP.

Alternately, an alternating pattern of more than one right PLEDP and left PLEDP are provided in a carrier tape (right/left/right/left etc.) spooled on a single reel or multiple reels for PNP machine use. In either implementation, the carrier tape may have a unique guide or registration hole next to the carrier that corresponds with orientation of the PLEDP, i.e. either a left PLEDP or right PLEDP. This registration hole or guide is recognizable to the PNP machine for proper programming and placement. The registration hole or guide will also define the rotational orientation of the PLEDP in the carrier, recognizable to the PNP machine for programming and placement.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A stereoscopic display system having a curved display, and operable to produce a 3D image through first and second polarized lenses worn by an observer, comprising:
    first and second light emitting packages positioned on different first and second regions of the curved display, respectively;
    third and fourth light emitting packages positioned on the first and second regions of the curved display, respectively
    first and second left polarizers positioned above or within the third and fourth light-emitting packages, respectively; and wherein the first and second polarizers polarize light that aligns with the first polarized lens; and
    third and fourth polarizers positioned above or within the third and fourth light-emitting packages, respectively; and wherein the third and fourth polarizers polarize light that aligns with the second polarized lens; and
    wherein the second polarizer has a non-zero rotation relative to the first polarizer, such that light incident upon the first polarized lens and emitted by the first package aligns with light incident upon the first polarized lens and emitted by the second package.

2. The stereoscopic display system of claim 1, wherein the first light emitting package is part of a first LED tile or module, and the second light emitting package is part of a different, second LED tile or module.

3. The stereoscopic display system of claim 2, wherein at least the first LED tile or module comprises additional light emitting packages arranged in a checkerboard pattern.

4. The stereoscopic display system of claim 2, wherein at least the first LED tile or module comprises additional light emitting packages arranged in non-parallel rows.

5. The stereoscopic display system of claim 1, wherein each of the first and second light emitting packages contains a diffuser element.

6. The stereoscopic display system of claim 1, wherein the first polarizer is disposed within a cavity of the first package.

7. The stereoscopic display system of claim 1, wherein the first polarizer is positioned above the first package.

8. The stereoscopic display system of claim 1, wherein at least one of the regions comprises a compound curve.

9. The stereoscopic display system of claim 1, wherein at least one of the regions comprises a simple curve.

10. The stereoscopic display system of claim 1, wherein each of the first and second light emitting packages is configured to emit first, second, and third different colors.

11. The stereoscopic display system of claim 2, wherein the LED tile or module comprises alternating rows of differently polarizing light emitting packages.

12. The stereoscopic display system of claim 1, wherein the first light emitting package is rotated relative to the second light emitting package.

13. The stereoscopic display system of claim 1, further comprising a third light emitting package disposed on a third region of the display different from the first and second regions, the third light emitting package having a polarizer that is rotated relative to the first polarizer such that the polarizations of light incident upon the first polarized lens and emitted by the third package, are aligned with the light incident upon the first polarized lens and emitted by the first package.

14. A method of configuring a 3D imaging display system to improve stereoscopic quality of a curved light emitting display, when viewed by an observer through first and second polarized lenses, comprising:
providing a first region of a display with a first light emitting package having a first polarizer that polarizes light that aligns with the first polarized lens;
providing a second region of the display with a second light emitting package having a second polarizer that concurrently polarizes light that aligns with the first polarized lens; and
wherein the first polarizer is rotated relative to the second polarizer to a non-zero degree that at least partially aligns polarizations of (a) light incident upon the first polarized lens and emitted by the first package with (b) light incident upon the first polarized lens and emitted by the second package.

15. The method of claim 14, further comprising configuring the first light emitting package with a diffuser.

16. The method of claim 14, further comprising disposing the first polarizer in a cavity of the first light emitting package.

17. The method of claim 14, further comprising disposing the first and second polarizers on a surface of the first and second light emitting packages, respectively.

18. The method of claim 14, further comprising disposing the first and second light emitting packages on different compound curved regions of the display.

19. The method of claim 14, further comprising providing the 3D imaging display system with a third region of the display system different from the first and second regions, the third region including a third light emitting package having a third polarizer rotated relative to the first polarizer such that le polarizations of light incident upon the first polarized lens and emitted by the third package, are aligned with the light incident upon the first polarized lens and emitted by the first package.

* * * * *